UNITED STATES PATENT OFFICE.

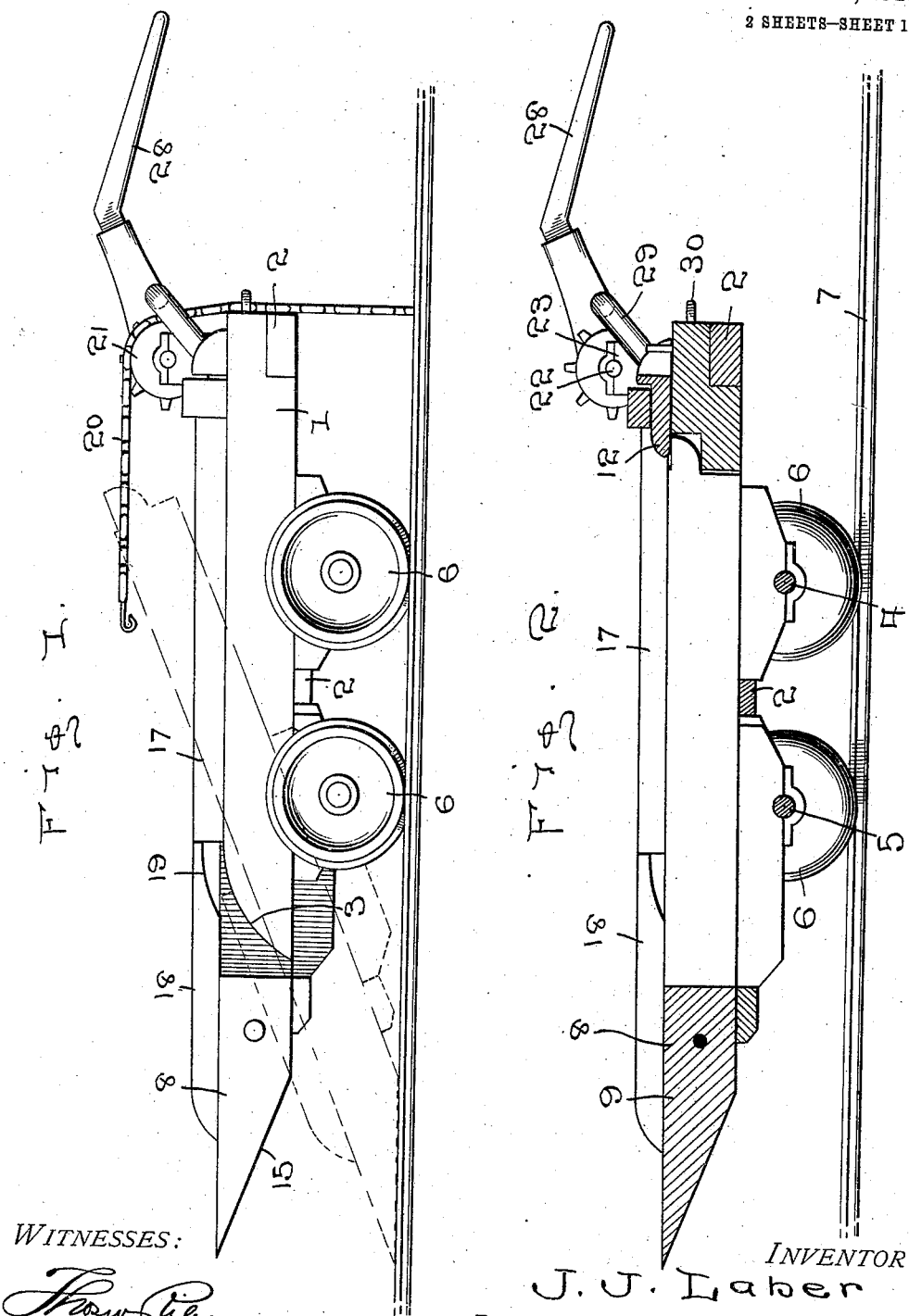

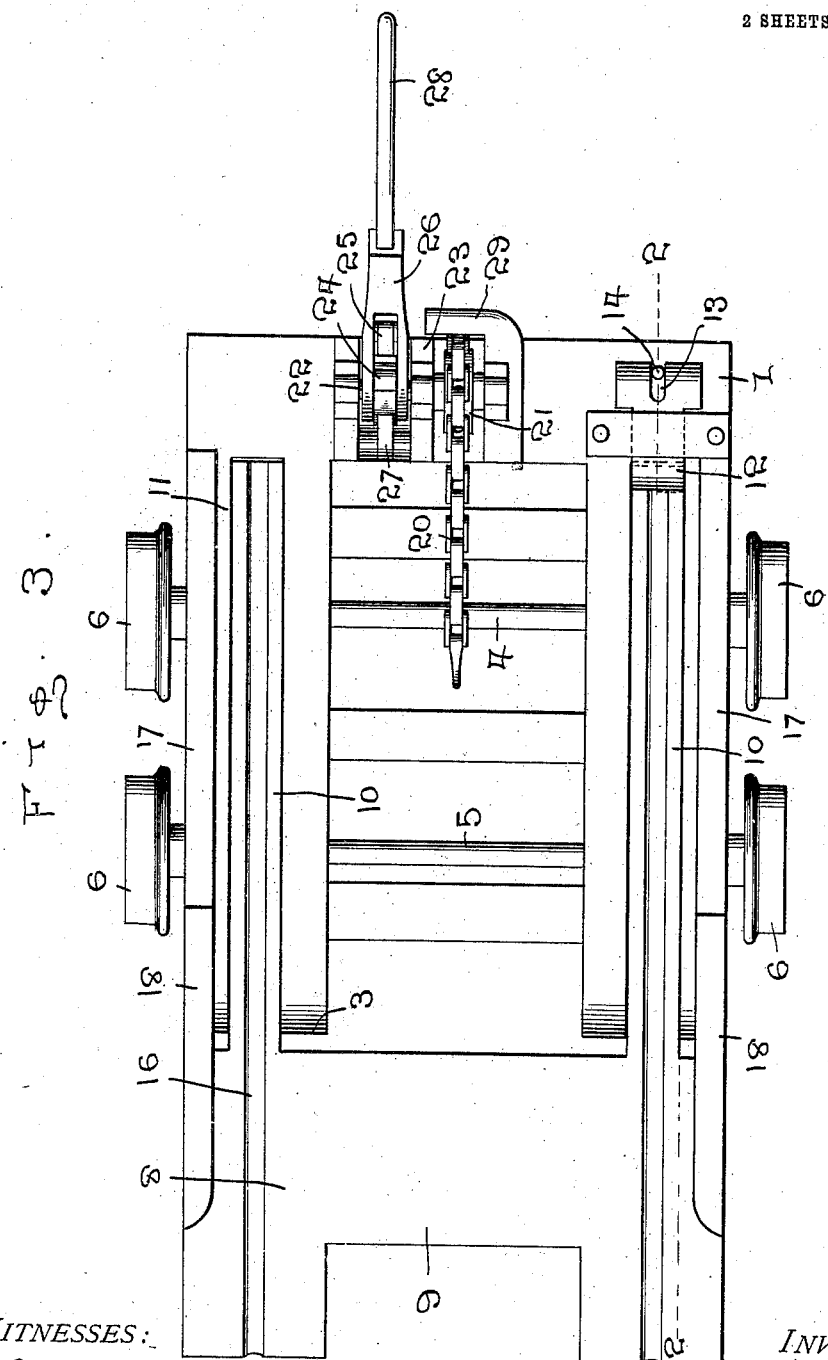

JOHN J. LABER, OF HARRISBURG, ILLINOIS.

TRUCK.

986,580.  Specification of Letters Patent.  Patented Mar. 14, 1911.

Application filed November 8, 1910. Serial No. 591,252.

*To all whom it may concern:*

Be it known that I, JOHN J. LABER, a citizen of the United States, residing at Harrisburg, in the county of Saline and State of Illinois, have invented certain new and useful Improvements in Trucks; and I do hereby declare the following to be a full, clear, and exact description of the invention, such as will enable others skilled in the art to which it appertains to make and use the same.

My invention relates to new and useful improvements in trucks and more particularly to that class adapted to be used for transporting machinery in mines and elsewhere and my object is to provide a truck which may be readily moved over a trackway.

A further object is to provide a tilting portion, one edge of which may be lowered into engagement with a trackway when the machinery is being placed upon or removed from the truck.

A further object is to provide manually operated means for drawing the machinery onto the platform of the truck, and, a further object is to provide means for holding the platform against tilting when desired.

Other objects and advantages will be hereinafter set forth and pointed out in the specification.

In the accompanying drawings, which are made a part of this application, Figure 1 is a side elevation of the truck, showing the tilted position of the platform by dotted lines. Fig. 2 is a longitudinal sectional view as seen on line 2—2, Fig. 3, and, Fig. 3 is a top plan view of the truck.

Referring to the drawings in which similar reference numerals designate corresponding parts throughout the several views, 1 indicates a frame, which is preferably rectangular in general outline and is suitably braced by means of cross bars 2, one end of the side rails of the frame being curved, as shown at 3 in Fig. 1. The frame 1 is mounted upon axles 4 and 5 and on said axles are secured wheels 6, which travel over the track rails 7, said wheels and track rails being constructed in the usual or any preferred manner.

Pivotally mounted on the axle 5 is a platform 8, said platform comprising a body portion 9 and arms 10 extending therefrom, said arms being preferably formed integral with the body portion. The arms 10 when in a horizontal position rest in ways 11 in the side rails of the frame, thereby securely bracing the platform when in a horizontal position. The platform is held against tilting movement by a keeper 12, which is slidably mounted upon the frame 1 and has one of its ends projecting over the end of one of the side arms, the keeper being held in position on the frame by forming a slot 13 in one end thereof, which coöperates with a pin 14 carried by the frame. The under face of the forward portion of the platform 8 is tapered, as shown at 15, to bring said forward edge to a point so that when the platform is tilted the machinery or other devices will readily travel onto the platform. As the machinery to be transported is usually provided with wheels, the upper faces of the arms and the platform are provided with grooves 16 for the reception of said wheels, or if preferred, trackways may be placed thereon.

The side rails of the frame 1 are provided with guard rails 17 and the platform 8 is likewise provided with guard rails 18, which aline with guard rails 17 when the platform is elevated or in a horizontal position, thereby forming a continuous guard rail. The guard rails 18 project over the curved portion of the side rails of the frame and have a portion of their under faces curved, as shown at 19, which curved portion rests upon the curved ends of the side rails when the platform is lowered, thus strengthening the platform when the machinery is being placed thereon or removed therefrom.

In placing the machinery on the platform the keeper 12 is moved outwardly its full distance when the platform 8 will immediately swing on the axle 5 and the tapered end thereof engage the track rails 7. One end of a chain 20 is then engaged with the machinery when by rotating the sprocket wheel 21, with which the chain coöperates, the machinery will be drawn on to the platform and as the machinery moves onto the platform it will be gradually raised to a horizontal position, where it is held by means of the keeper 12. The sprocket wheel 21 is mounted on a shaft 22, which is in turn mounted in bearings 23 on the cross bar of the frame 1 and said shaft is also provided with a ratchet 24, with which coöperates a pawl 25 of a swinging lever 26, which lever is pivoted on said shaft. The ratchet 24 is held against reverse rotation by means of a latch 27, which is also mounted upon the frame 1. The free end of the lever 26 terminates in a socket in which is introduced one end of a bar 28, the major portion of said bar extending at an angle to the longitudinal trend of the lever. The chain 20 is held in proper alinement with respect to the sprocket wheel 21 by means of a guide arm 29, which is substantially L-shaped and has one of its ends extended across the chain and sprocket, while the opposite end is secured to the frame of the truck. The chain also travels through a loop 30 on the end of the frame, said loop also serving to guide the chain onto the sprocket. The ratchet and lever may also be used for easing the machinery off the platform, in which instance the latch 27 is disengaged from the ratchet and the lever thrown over slowly until it has reached it full stroke, when by reëngaging the latch with the ratchet the lever may be swung in the opposite direction to obtain a new purchase, the pawl being first disengaged from the ratchet, this operation being repeated until the machinery is resting on the track rails.

This device can be very cheaply constructed and at the same time rendered extremely strong and durable and by providing the tilting platform it will be seen that the machinery can be easily moved upon the platform or removed therefrom, and, it will likewise be seen that by mounting the truck upon wheels, as shown the machinery may be transported to any part of the mine or to any place outside of the mine where a track is extended.

What I claim is:

1. A truck, comprising a frame, supporting axles therefor, a platform having arms pivoted on one of said axles, the frame having ways therein in which said arms are embedded when in horizontal position and means to hold the platform in a horizontal position.

2. In a truck the combination with a platform, supporting axles therefor and wheels on said axles, of a platform having arms pivoted to one of said axles, said frame having ways to receive the arms, means to hold the platform against tilting action and guard rails on the platform adapted to engage the side rails of the frame when the platform is in its tilted position.

3. In a truck the combination with a frame having ways therein, supporting axles and wheels on said axles, of a platform having its forward edge tapered and arms projecting from the opposite edge, said arms being pivoted on one of the axles, said platform and arms having means to receive an object, guard rails on the frame and platform, the guard rails of the platform being adapted to engage the end of the frame when the platform is tilted the engaging portion of said frame and guard rails being curved.

In testimony whereof I have signed my name to this specification in the presence of two subscribing witnesses.

JOHN J. LABER.

Witnesses:
G. W. DUNCAN,
FRED LABER.

Copies of this patent may be obtained for five cents each, by addressing the "Commissioner of Patents, Washington, D. C."